United States Patent [19]
Kreissig

[11] 3,896,740
[45] July 29, 1975

[54] PNEUMATIC BOGIE STABILIZER

[75] Inventor: Ernst Florian Kreissig, Seuzach, Switzerland

[73] Assignee: Schweizerische Lokomotiv-und Maschinenfabrik, Winterthur, Switzerland

[22] Filed: Dec. 27, 1973

[21] Appl. No.: 428,778

[30] Foreign Application Priority Data
Jan. 9, 1973 Switzerland............................ 253/73

[52] U.S. Cl. ............. 105/164; 105/175 A; 105/184; 105/199 R; 105/210; 267/3
[51] Int. Cl........... B61f 3/04; B61f 5/24; B61f 5/50
[58] Field of Search .... 267/3, 152; 105/164, 175 A, 105/182 R, 199 R, 184, 210

[56] References Cited
UNITED STATES PATENTS

| 3,612,506 | 10/1971 | Malherbe | 267/152 |
| 3,614,931 | 10/1971 | Adler | 105/453 X |
| 3,717,104 | 2/1973 | Law et al. | 105/182 R X |
| 3,734,030 | 5/1973 | Keissig | 105/182 R X |

FOREIGN PATENTS OR APPLICATIONS

| 278,869 | 3/1966 | Australia | 105/175 A |
| 546,819 | 8/1956 | Italy | 105/164 |

*Primary Examiner*—M. Henson Wood, Jr.
*Assistant Examiner*—Howard Beltran
*Attorney, Agent, or Firm*—Kenyon & Kenyon Reilly Carr & Chapin

[57] ABSTRACT

The car and body are provided therebetween with a force transmitting means which imposes a coupling moment on the bogie to compensate for a moment induced by bucking and the like, for example at starting of the vehicle. The force transmitting means uses pairs of vertically disposed pneumatic spring bellows between the bogie and body with opposite bellows being interconnected in a cross-wise pattern. The force transmitting means can also be in the form of double-acting actuators which have their respective pressure chambers connected in cross-wise manner.

10 Claims, 5 Drawing Figures

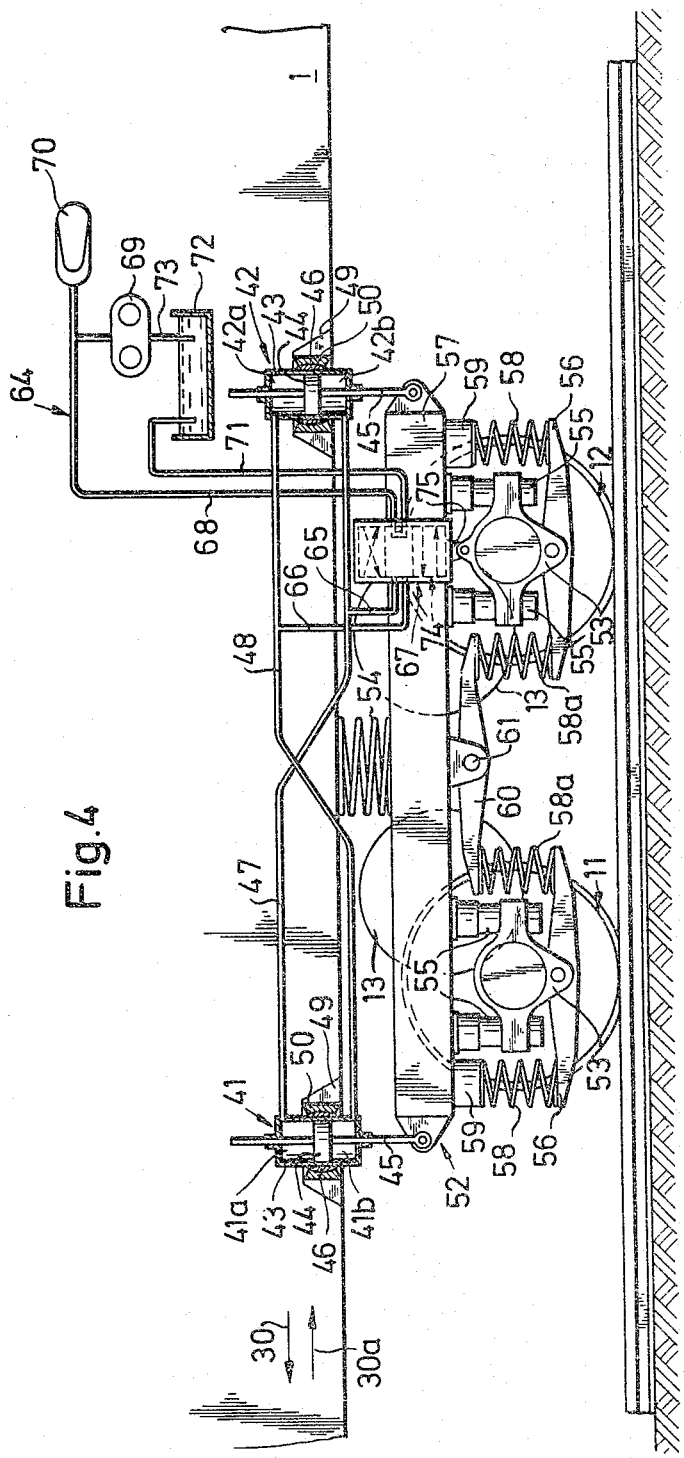

PNEUMATIC BOGIE STABILIZER

This invention relates to an axle-load compensator for a vehicle bogie and particularly for a rail vehicle.

Heretofore, in order to reduce the axle loading caused by a tractive effort in a rail vehicle having a body mounted on a pair of bogies, a pressure cylinder has been mounted at each end of the vehicle body. Each pressure cylinder has been connected via a compressed-air-operated piston to the front end of the leading bogie and a compressed-air-operated piston to the rear end of the trailing bogie.

In this known system, a compensating force and therefore a compensating torque opposing a bucking torque caused by the tractive effort is applied to whichever is the leading bogie of the vehicle. Generally, the reaction corresponding to the compensating force is taken up by the vehicle mounting at the center of the bogie. Consequently, the compensating equipment may be accidentally affected by pitching and hunting movements of the vehicle body, the compensating force varying in dependence upon these dynamic influences.

Accordingly, it is an object of the invention to provide an axle compensator which enables a compensating force to be introduced into a bogie independently of a body mounting.

It is another object of the invention to compensate for bucking in a leading bogie in an automatic manner.

It is another object of the invention to damp the dynamic action of a load compensator due to body springing.

It is another object of the invention to compensate for bucking torque without affecting a body mounting at the center of a bogie.

It is another object of the invention to transmit a load compensating force simply despite lateral shifts of a bogie relative to a supported body.

Briefly, the invention provides an axle load compensator for use between a vehicle bogie and a supported vehicle body which comprises a pair of force transmitting means for imposing a coupling moment on the bogie to compensate for a bucking torque or the like. Each force transmitting means is disposed to one respective side of the bogie relative to a vertical plane through the bogie and each includes a pair of opposed pressure elements disposed in vertical relation to each other. In addition, a pair of connecting lines are used to interconnect the pressure elements in cross-wise manner with each line communicating an upper pressure element of one force transmitting means with a lower pressure element of the other force transmitting means.

At starting, the compensator imparts a coupling moment on the bogie to oppose the bucking torque imposed on the bogie. The pairs of forces produced by the compensator effect a pure compensating torque without effecting the body mounting at the center of the bogie. Similarly, hunting motions of the vehicle body do not affect the compensating torque.

In one embodiment, the pressure elements are mounted at the opposite ends of a bogie while the connecting lines are pressure lines which convey a pressure medium between the respective pairs of interconnected elements. In addition, extra forces can be transmitted to the bogie to achieve a predetermined compensating torque, if the two pressure lines are connected via a control element to a pressure medium supply means wherein the control element can be operated between two operative positions associated with the two pressure lines to selectively connect one of the lines to the supply means. In order to damp dynamic action of the compensator due to body springing, the connection between the control element and the pressure lines includes one throttle element in each case.

In order to damp oscillations between the vehicle body and the bogie and to provide a simple way of transmitting the compensating forces despite lateral shifts of the bogie relatively to the body, the pressure elements can be pneumatic spring bellows which are each disposed between two bearing surfaces of the vehicle body and bogie.

In order to enable similar components to be used as in conventional compensators the two pressure elements which are disposed one above another can be formed by at least one reciprocating actuator. In this case, the compensator can operate automatically.

Depending upon the construction of the rail vehicle, the action of the compensator can be amplified, if the control element has an adjusting system controllable in dependence upon the position of one of two relatively movable parts of the rail vehicle. A particular advantage is that this feature enables the movements of individual wheel axles to control or amplify the compensating forces or to adjust the bogie frame in accordance with the position of the wheel axles.

Conveniently, so that the compensator may be adapted to various operating conditions, the communication between the pressure medium supply means and the change-over control element comprises a flow control means adapted to be adjusted or controlled in accordance with a predetermined pressure in the two pressure lines. The invention can provide very advantageous compensation in all phase of operation if the flow control means has a control system adapted to be controlled in dependence upon the tractive effort to be transmitted between the vehicle body and the bogie.

These and other objects and advantages of the invention will become more apparent from the following detailed description and appended claims taken in conjunction with the accompanying drawings in which:

FIG. 1a shows part of a variant of the compensator of FIG. 1;

FIG. 4 illustrates a partial longitudinal sectional view of a compensator and bogie similar to FIG. 3 with a secondary compensator system.

Like reference characters are used in the drawings to indicate like parts.

Figure 1:
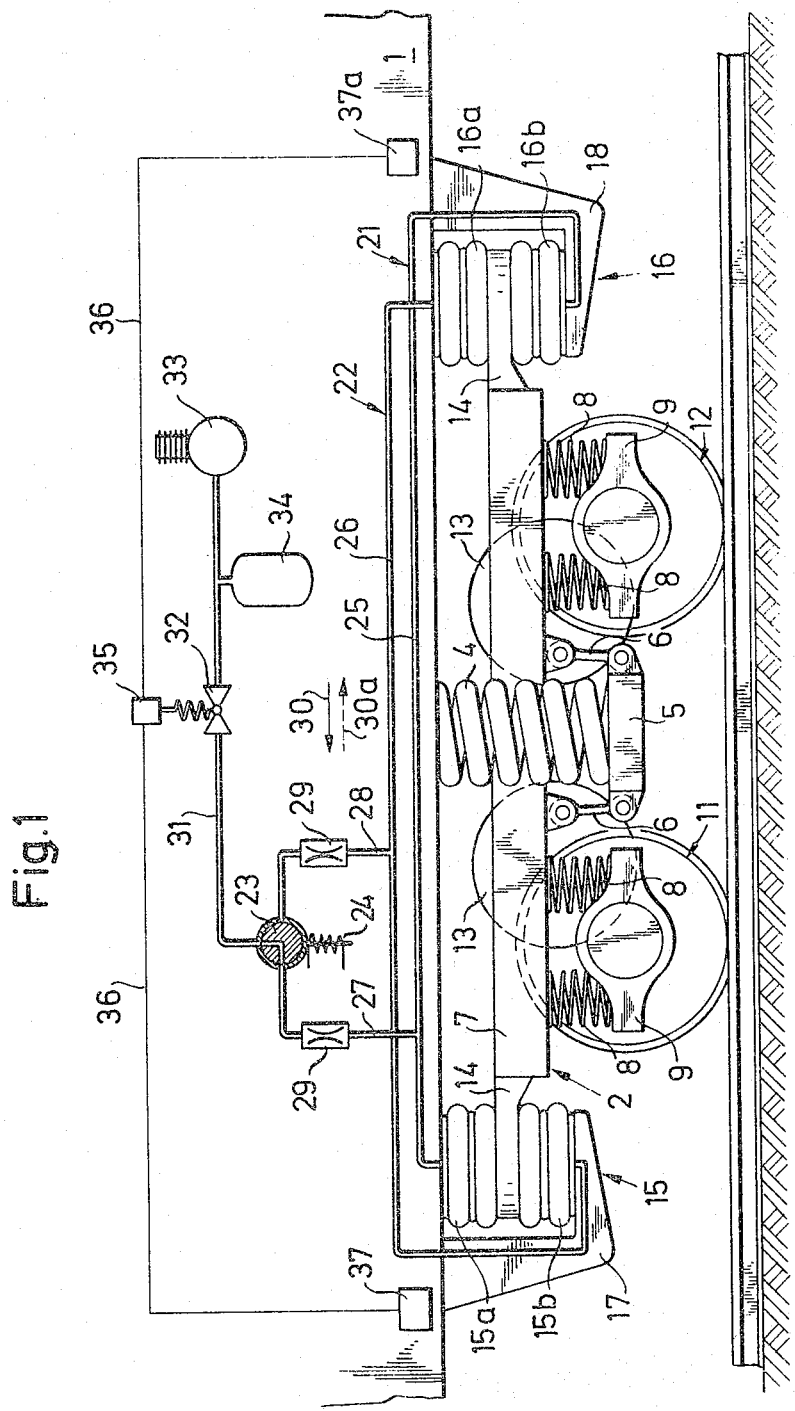
FIG. 1 illustrates a side elevational view of a rail vehicle bogie which has a compensator according to the invention.

Referring to FIG. 1, the rail vehicle which is shown mounted on rail includes a body 1 (only partly shown) and two four-wheeled bogies 2, only one of which is shown. The bogies 2 are each adapted to rotate around a physical vertical pivot or an imaginary vertical axis and are connected to the body 1 via a means (not shown) for transmitting tractive forces. The body 1 is carried by two springs 4 disposed near and laterally of the vertical pivot or axis on each of the two bogies 2. Each spring 4 is secured to a spring support member 5 suspended by means of two hangers 6 on bogie frame 7. The frame 7 in turn is carried by way of springs 8 on axle boxes 9 of two wheel sets 11, 12 each having a driving motor 13. Each motor 13 is disposed in the frame 7. Depending upon construction, there can be more than two springs 4.

At both ends of bogie 2, the frame 7 has a bracket 14 which is connected to the vehicle body 1 via a load axle compensator having force transmitting means 15, 16 for transmitting a vertical compensating force to the body 1. Each force transmitting means 15, 16 includes two pressure elements 15a, 15b and 16a, 16b respectively, which are disposed one above another and which are formed by pneumatic spring bellows. As shown, the bracket 14 is sandwiched between the spring bellows. The top ends of the spring bellows 15a, 16a are connected to the body 1 while the bottom end of the lower spring bellows 15b, 16b are connected to a bracket 17, 18 mounted in depending fashion on the body 1.

In a similar construction shown in FIG. 1a, the spring bellows 15a, 15b and 16a, 16b are disposed in tongs-like mountings 19 disposed at both ends of a bogie frame 7. Only the mounting 19 for the elements 15a, 15b is shown in FIG. 1a. The outsides of the spring bellows 15a, 15b contact the jaws of the mounting 19, and those sides of the spring bellows 15a, 15b which are near one another abut a projection 20 which engages between them and which is secured to the vehicle body 1.

The two force transmitting means 15, 16 of the compensator are connected in cross-wise manner by way of two line systems 21, 22 and are connected to a control element 23 adapted to be changed over by an electric relay 24. As shown, the element 23 is a three-way valve but, of course, for instance, a corresponding two-way valve can be used. The relay 24 is connected to a driver's reverser. The systems 21, 22 each comprise two pressure connecting lines 25, 27 and 26, 28 respectively. Line 25 interconnects elements 15a and 16b while line 26 interconnects elements 16a and 15b; each line 27, 28 also includes a restrictor 29.

The control element 23 is connected to a pressure line 31 through which compressed air can flow and which includes a flow control means in the form of an adjustable valve 32 and which is connected to the output of a compressor 33. The line 31 is also connected to a compensation air reservoir 34 between the valve 32 and compressor 33. Valve 32 has an adjusting device 35 which is connected via control lines 36 to two control facilities 37, 37a which are each controllable via the motor current in a manner which is not shown and in dependence upon the tractive effort to be transmitted between the body 1 and bogie 2. Depending upon the direction of vehicle travel, one of the facilities 37, 37a transmits a signal to the adjuster 35 which adjusts the valve 32 in accordance with a predetermined required pressure in the lines 21, 22.

When the vehicle starts — in a direction assumed to be as indicated by an arrow 30 to the left — relay 24 is so energized via the driver's reverser that the control element 23 moves into the position which is shown and in which line 31 is connected to system 21. Consequently, and if the compressor 33 is in operation, the elements 15a and 16b are raised, i.e., elongated under the pressure set by the valve 35 so that two equal and opposite forces act on the bogie frame 7. This produces a couple which acts on the ends of frame 7 to effect a counterclockwise torque which opposes the bucking caused by the tractive effort, particularly at starting, and which therefore also opposes any reduction in the loading of the wheel set 11. No extra loading of the body mounting by reactive forces occurs, and neither nosing movements of the bogie 2 nor nosing and hunting movements of the body 1 affects compensation of the bucking torque.

The restrictor 29 in the line 27 compensates for any dynamic control factors due, e.g., to jerky transmission of the tractive effort. The spring bellows 15a, 15b and 16a, 16b provide immediate damping of any oscillations of the bogie frame 7.

When the vehicle starts in the opposite direction — i.e., to the right in the direction indicated by a chainline arrow 30a — the relay 24 so moves the element 23 from the position shown, that line 31 is connected to system 22 and, correspondingly, the spring bellows 16a and 15b are pressurized. Thus, a corresponding couple is introduced into the bogie frame 7 and a clockwise compensating torque is produced which opposes a reduction in the loading of the wheel set 12.

Figure 2:
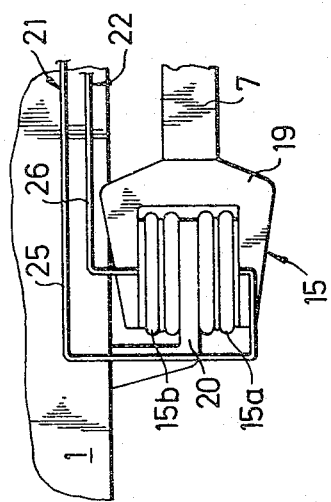
FIG. 2 illustrates a partial longitudinal sectional view of a bogie having a modified compensator according to the invention.

Referring to FIG. 2, the bogie 2 has two force transmitting means in the form of actuators 41, 42 each comprising a double-acting pressure cylinder 43 which is mounted on the vehicle body 1 and a piston 44 reciprocally mounted in the cylinder 43 to divide the cylinder into two vertically disposed pressure chambers 41a, 41b, 42a, 42b. The piston 44 is disposed on a continuous piston rod 45 which extends in sealing-tight fashion through the two ends of the cylinder and is pivotaly connected at one end to a member on the frame 7. Each cylinder 43 has a guide ring 46 having a spherical outside surface mounted for universal pivoting in a corresponding mounting 50 secured to the vehicle body 1 by means of support members 49.

The pistons 44 and the cylinder chambers 41a, 41b, 42a, 42b which they bound form the pressure elements of the force transmitting means 41, 42. The cylinders 43 are cross-connected by two pressure lines 47, 48 which in each case connect the top cylinder chamber 41a or 42a of one cylinder to the bottom cylinder chamber 42b or 41b of the other cylinder. This construction has no externally controlled means for influencing the compensating forces. Instead, the pressure necessary to initiate the compensating forces build up automatically, the pressure medium being displaced from one cylinder chamber, e.g., 41a and entering the other, e.g., 42b so that a compensating torque opposed to the bucking torque is produced.

Because of the piston rod 45, which is guided in the two cylinder ends, the effective areas of both sides of each piston 44 are equal. The suspension of the cylinders 43 in the mountings 50 provides continuous compensation of the forces which arise, since the cylinders 43 can take up any adjustment to suit relative movements of the body 1 and bogie 2, for instance, in the case of lateral deflections. Correspondingly, the bogie 2, which is interlaced with the body 1, is guided substantially parallel thereto.

Figure 3:
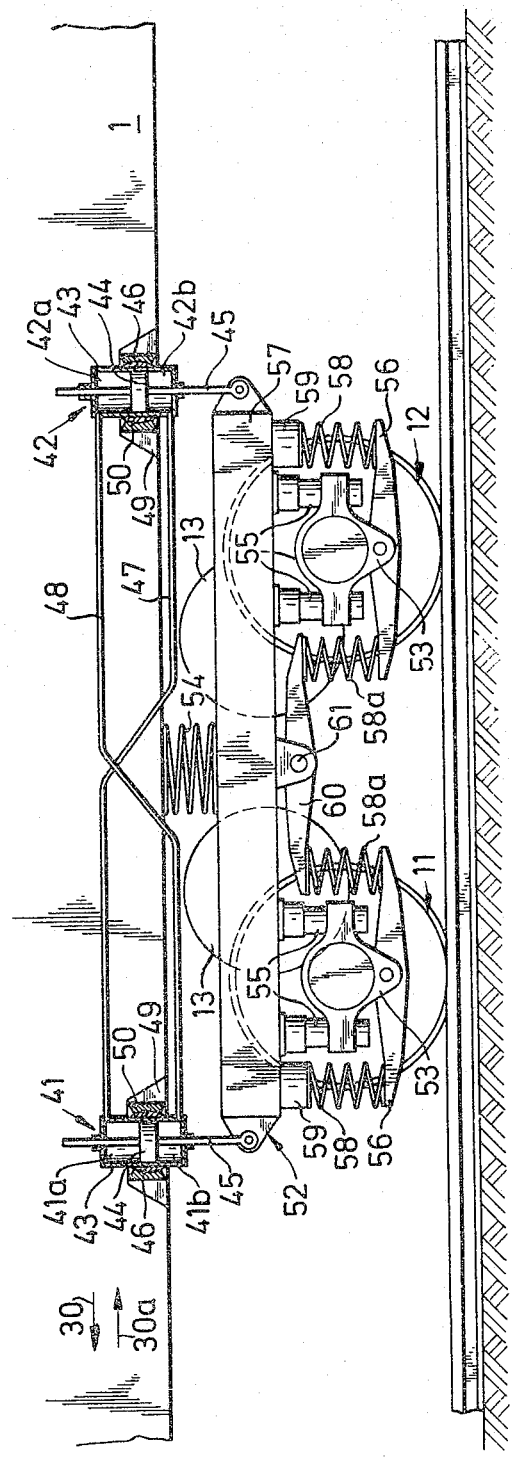
FIG. 3 illustrates a partial longitudinal sectional view of a compensator similar to that shown in FIG. 2 and a modified bogie.

Referring to FIG. 3, the vehicle body 1 is carried by two springs 54, only one of which can be seen and which are disposed on a frame 57 of a four-wheeled bogie 52. The wheel sets 11, 12 are mounted in axle boxes 53 which are guided for vertical movement by two pins or pegs or the like 55 disposed on the frame 57. A double arm compensating lever 56 is articulated to each axle box 53 and carries springs 58, 58a at each end. The frame 57 bears on the spring 58 by way of bearing parts 59 and on springs 58a by way of two double-armed compensating levers 60, each pivoted on both sides of the bogie 52 to a bogie frame pin or the like 61 disposed between the wheel sets 11, 12.

In this construction, the forces which act on the wheel sets 11, 12 when the vehicle is in motion are, in known manner, compensated via the levers 56, 60 which can adjust themselves in accordance with the position of the wheel axles. Load compensation can therefore be provided when the vehicle is negotiating routes where there are abrupt reversals of gradient — i.e. where there may be concave or convex track curvature in which the wheel sets 11, 12 are at different distances from the frame 57. The actuators 43, 44 interconnected by the pressure lines 47, 48 act in the manner hereinbefore described to oppose reduction of front-axle loading due to tractive effort.

Referring to FIG. 4, the compensator which is similar to that of FIG. 3 can be amplified by a secondary compensator 64. As shown, pressure lines 47, 48 are each connected via a respective connecting line 65, 66 to a control element 67, which is a three-way valve connected via pressure lines 68 to a pump 69 and compensating reservoir 70 and by a return line 71 to a pan 72. An intake line 73 extends to pump 69 from pan 72 which contains a hydraulic medium, oil in this example. The valve 67 comprises a casing, secured to the frame 57 and a control piston 74 which is guided in the casing and which is coupled via an adjuster 75 with the axle box 53 of wheel set 12.

The valve 67 is, in known manner, so devised that piston 74 can move between a central inoperative position, as shown in FIG. 4, and two operative positions. The central position corresponds to normal travel when the distances between the axles 11, 12 and the frame 57 are all the same. When the piston 74 is in this central position, the ports to the connecting lines 65, 66 are in the closed state and the pressure line 68 is in communication with the return line 71, the pump 69 working inoperatively. When the ports to the lines 65, 66 are closed, the compensator 41, 42, 47, 48 operates exactly as in the structure shown in FIG. 3.

The secondary compensator 64 heightens the effect of the primary compensator embodied by the two actuators 43, 44, particularly when the vehicle is travelling over routes having gradient reversals. If, for instance, the distance of the wheel set 11, which is the leading set when the vehicle travels in the direction indicated by the arrow 30, from the frame 52 increases in a section of track having a convex gradient reversal, with a corresponding reduction in the distance between the wheel set 12 and the frame 52, piston 74 rises from the central position into one of the operative positions so that line 68 communicates with line 65 and line 66 communicates with the return 71. The two cylinder chambers 41a, 42b are therefore further pressurized by the pump 69 via the line 47, while the pistons 44 apply a couple to the frame 57 opposing any reduction in the loading of wheel set 11.

Conversely, when the distance between wheel set 11 and frame 57 decreases and there is a corresponding increase in the distance between wheel set 12 and frame 57, piston 74 descends into the other operative position in which line 68 communicates with line 66 and line 65 communicates with the return 71, so that the pressure of the pump 69 is operative in the cylinder chambers 42a, 41b and a couple opposing any reduction in the loading of wheel set 12 is applied to frame 57.

Various other embodiments of the invention are possible. For instance, the primary and secondary compensators can be controlled by way of electrical fluidic elements. For instance, a mechanical or hydraulic linkage can be used instead of a pneumatic means to interconnect the mountings joining the vehicle body to the bogie.

Individual features of the various embodiments can of course be combined with one another as required. For instance, the control of a secondary compensator of the kind shown in FIG. 4 could be derived not from the position of the axle boxes but, for instance, from the tractive effort to be transmitted between the vehicle body and the bogie or in dependence upon some other appropriate reference parameter. Also, instead of double-acting units, for instance, two corresponding single-acting units can be used in each case.

What is claimed is:

1. In combination with a vehicle body and a bogie supporting said vehicle body thereon; an axle load compensator comprising a pair of force transmitting means for imposing a coupling moment on said bogie, one of said means being disposed on one side of said bogie relative to a vertical plane through said bogie and the other of said means being disposed on an opposite side of said bogie, each said means including a pair of opposed pressure elements disposed in vertical relation to each other; and a pair of connecting lines, each said line communicating an upper pressure element of one force transmitting means with a lower pressure element of the other force transmitting means whereby pressure medium in one force transmitting means is transmitted to the other to impart an upwardly directed compensating force in said other force transmitting means to oppose a bucking torque imposed on said bogie.

2. The combination as set forth in claim 1 wherein said connecting lines are conduits and said pressure elements are responsive to a flow of pressure medium and which further comprises a means for supplying pressure medium and a control element positioned between said pressure medium supply means and said lines to selectively connect one of said lines with said pressure medium supply means whereby pressure medium is conveyed to a selective pair of pressure elements to impart two equal and opposite forces on said bogie at said opposite sides to produce a coupling moment on said bogie.

3. The combination as set forth in claim 2 which further includes a throttle in each of said lines downstream of said control element.

4. The combination as set forth in claim 2 which further includes a wheel frame movably mounted on said bogie and an adjusting means connected to said control element to selectively connect said pressure medium supply means to said lines in response to a vertical movement between said bogie and said wheel frame.

5. The combination as set forth in claim 2 which further comprises a flow control means between said pressure medium supply means and said control element for controlling the pressure of the pressure medium delivered to said control element and lines.

6. The combination as set forth in claim 5 wherein said flow control means includes an adjusting device adapted to be controlled in dependence on a tractive effort to be transmitted between said body and said bogie.

7. The combination as set forth in claim 1 wherein each force transmitting means includes a double-acting pressure cylinder and a piston reciprocally mounted therein to divide said cylinder into two vertically disposed pressure chambers wherein said piston and each portion of said cylinder defining a respective one of said chambers defines a respective one of said pressure elements.

8. The combination as set forth in claim 1 wherein each said pressure element is a pneumatic spring bellows disposed between a bearing surface on said vehicle body and a bearing surface on said bogie.

9. In combination with a vehicle body and a bogie supporting said vehicle body thereon; an axle load compensator comprising a pair of force transmitting means for imposing a coupling moment on said bogie, one of said means being disposed on one end of said bogie and the other of said means being disposed on an opposite end of said bogie, each said means including a pair of opposed pneumatic spring bellows disposed in vertical relation to each other;

a pair of connecting lines, each said line communicating an upper spring bellows of one force transmitting means with a lower spring bellows of the other force transmitting means;

a means for supplying pressure medium; and a control element positioned between said pressure medium supply means and said lines to selectively connect one of said lines with said pressure medium supply means whereby pressure medium is conveyed to a selective pair of spring bellows to impart two equal and opposite forces on said bogie at said opposite sides to produce a coupling moment on said bogie.

10. In combination with a vehicle body and a bogie supporting said vehicle body thereon; an axle load compensator comprising a pair of force transmitting means for imposing a coupling moment on said bogie, one of said means being disposed on one side of said bogie relative to a vertical plane through said bogie and the other of said means being disposed on an opposite side of said bogie, each said means including a cylinder having a reciprocally mounted piston therein dividing said cylinder into a pair of vertically disposed chambers;

a pair of connecting lines, each said line communicating an upper chamber of one force transmitting means with a lower chamber of the other force transmitting means;

a means for supplying pressure medium; and a control element positioned between said pressure medium supply means and said lines to selectively connect one of said lines with said pressure medium supply means whereby pressure medium is conveyed to a selective pair of cylinders to impart two equal and opposite forces on said bogie at said opposite sides to produce a coupling moment on said bogie.

* * * * *

UNITED STATES PATENT AND TRADEMARK OFFICE
CERTIFICATE OF CORRECTION

PATENT NO. : 3,896,740
DATED : July 29, 1975
INVENTOR(S) : PNEUMATIC BOGIE STABLIZER It is certified that error appears in the above-identified patent and that said Letters Patent are hereby corrected as shown below:

Column 7, line 31, change "pheumatic" to

--pneumatic--.

Column 8, line 8, change "sides" to --ends--.

Signed and Sealed this

Tenth Day of May 1977

[SEAL]

Attest:

RUTH C. MASON
*Attesting Officer*

C. MARSHALL DANN
*Commissioner of Patents and Trademarks*